(12) United States Patent
Iwamitsu et al.

(10) Patent No.: US 7,325,117 B2
(45) Date of Patent: Jan. 29, 2008

(54) STORAGE SYSTEM AND STORAGE CONTROL METHOD

(75) Inventors: Koji Iwamitsu, Odawara (JP);
Yoshihiro Uchiyama, Odawara (JP)

(73) Assignee: Hitachi, Ltd., Tokyo (JP)

( * ) Notice: Subject to any disclaimer, the term of this patent is extended or adjusted under 35 U.S.C. 154(b) by 290 days.

(21) Appl. No.: 11/250,488

(22) Filed: Oct. 17, 2005

(65) Prior Publication Data

US 2007/0038830 A1 Feb. 15, 2007

(30) Foreign Application Priority Data

Aug. 10, 2005 (JP) .............................. 2005-231520

(51) Int. Cl.
*G06F 13/00* (2006.01)
(52) U.S. Cl. .................... 711/167; 711/111; 711/156
(58) Field of Classification Search .................. None
See application file for complete search history.

(56) References Cited

U.S. PATENT DOCUMENTS

| 6,049,891 A * | 4/2000 | Inamoto .......................... 714/6 |
| 6,799,283 B1 * | 9/2004 | Tamai et al. .................... 714/6 |
| 7,149,846 B2 * | 12/2006 | Hetrick ........................ 711/114 |
| 2004/0236908 A1 | 11/2004 | Suzuki et al. |

* cited by examiner

*Primary Examiner*—Reginald Bragdon
*Assistant Examiner*—Thanh D Vo
(74) *Attorney, Agent, or Firm*—Mattingly, Stanger, Malur & Brundidge, P.C.

(57) ABSTRACT

A controller existing on a level above a media drive issues a first read command specifying a plurality of data blocks to the media drive, and upon detecting a time-out for the first read command, generates a second read command specifying a portion of the data blocks among the plurality of data blocks, and issues the second read command to the media drive. Upon receiving the portion of data blocks without detecting a time-out for the second read command, the controller reads the plurality of data blocks specified by the first read command by issuing the second read command to the media drive one or more times.

12 Claims, 7 Drawing Sheets

STORAGE SYSTEM AND STORAGE CONTROL METHOD

CROSS-REFERENCE TO PRIOR APPLICATION

This application relates to and claims priority from Japanese Patent Application No. 2005-231520, filed on Aug. 10, 2005, the entire disclosure of which is incorporated herein by reference.

BACKGROUND OF THE INVENTION

1. Field of the Invention

This invention relates to storage control technology.

2. Description of the Related Art

In a database system which handles vast amounts of data, such as for example a data center, a storage system configured separately from a host computer is used to manage data. Such a storage system is for example a disk array system such as a RAID (Redundant Array of Independent Inexpensive Disks) system, in which numerous media drives are arranged in an array. As the media drives provided in the storage system, for example, hard disk drives having a SATA (Serial ATA)-specification interface (hereafter, "SATA-HDD") may be adopted (see for example Japanese Patent Laid-open No. 2004-348876).

A HDD generally comprises the hard disks, and a control portion (for example, a control board and recording heads) which control data accessing of the hard disks. The control portion receives a read command specifying a data block group, and for each data block in the data block group, read processing to read the data block is performed, so that such data block groups can be read. If a certain data block cannot be read even when read processing is performed, the control portion attempts to read the data block which could not be read in one read processing trial by performing repeated read processing (that is, a read retry) to read the same data block.

Depending on the HDD state, there may occur cases in which read retries occur frequently in order to read a plurality of data blocks specified by a read command, so that a substantial amount of time may be required to read the plurality of data blocks.

One method of preventing this read time from becoming too long is a method of limiting the read time length. A HDD generally operates based on a variety of parameters set for the HDD. Depending on the type of HDD, these parameters may include a parameter related to limitation of the read time length (hereafter, a "limit parameter"), and in some cases it is possible to change the value of this limit parameter. Such a limit parameter may be, for example, the retry time, and/or the number of retries. The retry time is the amount of time required for a read retry of one data block, or, the total amount of time for one or more read retry trials performed when reading a data block group. The number of retries may be, for example, the maximum number of read retry trials for the same data block, or, the maximum number of read retry trials which can be performed when reading a data block group.

One type of HDD which enables modification of limit parameter values is, for example, an HDD having an interface which conforms to the fibre channel standard (hereafter an "FC-HDD"). The control portion of an FC-HDD can return an error (for example, time-out) if it is not possible to read a plurality of data blocks specified by a read command according to the value of a limit parameter set for the FC-HDD.

Such a circumstance may only occur when reading from a certain area on a hard disk, or may occur when reading from numerous areas. In the latter case, it is necessary to block the HDD. In the former case, if the HDD is similar to an FC-HDD, it should be possible to handle the problem by modifying the value of a limit parameter (for example, by increasing the value of the number of retries).

However, even in the former case, the above measure is not possible for HDD types which do not allow modification of limit parameter values. Hence there is the possibility that HDDs are blocked more than is necessary. One such HDD type is for example an SATA-HDD.

Hence an object of this invention is to prevent blockage, to an extent beyond what is necessary, of media drives having unmodifiable values of parameters relating to limits on read time lengths.

Other objects of the invention will become clear from the following explanation.

SUMMARY OF THE INVENTION

A storage system of this invention comprises a plurality of media drives, and a controller capable of issuing read commands to each of the plurality of media drives. The controller issues a first read command specifying a plurality of data blocks, to a certain media drive (the controller has first command issuing means). Upon detecting a time-out for the first read command, the controller generates a second read command specifying a portion of the data blocks among the plurality of data blocks, and issues this second read command to the certain media drive (the controller has second command issuing means). And upon receiving the portion of data blocks without detecting a time-out for the second read command, the controller, by issuing the second read command one time or more to the certain media drive, reads the plurality of data blocks specified by the first read command from the certain media drive. In read commands, the data blocks for reading may themselves be specified, or a range for reading may be specified.

In one aspect of the invention, a certain media drive can be a media drive having an unmodifiable parameter value relating to a limit on the read time length for data blocks specified by a read command. The certain media drive can be a hard disk drive having an interface conforming to the SATA standard.

In one aspect of the invention, the number of data blocks constituting the portion of data blocks can be made a value equal to or less than the value of the quotient obtained by dividing the length of time from issuance of the read command until time-out by the maximum length of time for reading one data block in the certain media drive.

In one aspect of the invention, the controller can select a number of data blocks specified by the second read command for the second and subsequent trials to be greater than the number of data blocks specified by the first trial of the second command after detecting a time-out for the first read command.

In one aspect of the invention, the plurality of media drives may comprise a spare media drive. The controller, when reading the plurality of data blocks according to one or more issues of the second read command, can issue, to the spare media drive, a write command to write the plurality of data blocks.

In one aspect of the invention, the controller, upon reading the plurality of data blocks by issuing the second read command one or more times, can issue to the certain media drive a write command to overwrite the plurality of data blocks on the certain media drive.

In one aspect of the invention, the controller, upon detecting a time-out for the second read command, can block the certain media drive (the controller may have blocking means). For example, the controller may block the certain media drive upon detecting a time-out even once for the second read command, or may perform blocking upon detecting a time-out two or more times.

In one aspect of the invention, the controller, upon issuing the second read command for the certain media drive, displays information relating to the certain media drive, and can change the display content according to whether a time-out has occurred for the second read command or blocking has occurred (the controller has display means).

In one aspect of the invention, the controller can transmit, a plurality of times, the first read command for the certain media drive, and when, in the plurality of transmissions, time-out is detected a prescribed number of times, the certain media drive can be blocked (the controller has blocking means).

In a storage control method of this invention, a first read command specifying a plurality of data blocks is issued to a certain media drive; when a time-out is detected for the first read command, a second read command is generated specifying a portion of the data blocks among the plurality of data blocks, and the second read command is issued to the certain media drive; and when the portion of data blocks are received without detecting a time-out for the second read command, by issuing the second read command one or more times to the certain media drive, the plurality of data blocks specified by the first read command are read from the certain media drive. This storage control method can be realized by either one among the storage system and a host device connected to the storage system, or by both acting in concert. This storage control method can be executed by having a processor read and execute a computer program to cause a processor to execute each of the operations of the method.

DESCRIPTION OF THE PREFERRED EMBODIMENTS

Below, a number of embodiments of the invention are explained, referring to the drawings.

Embodiment 1

Figure 1:
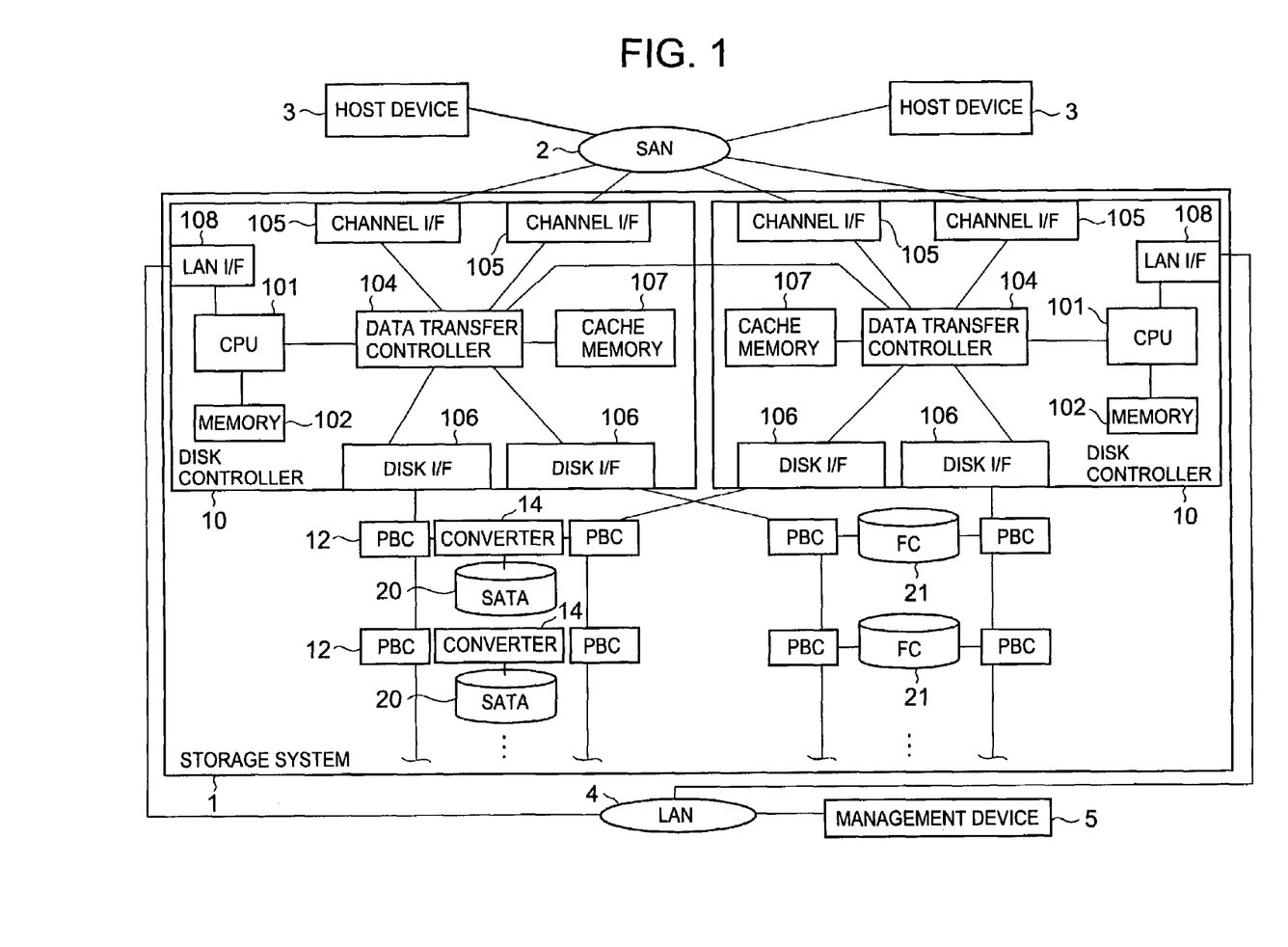
FIG. 1 shows the storage system of a first embodiment of the invention.

FIG. 1 shows the storage system of a first embodiment of the invention.

The storage system 1 comprises redundant (for example, dually redundant) disk controllers 10, 10 and a plurality of media drives 20, 21. The storage system 1 is connected to one or more host devices 3 and to a management device 5. Specifically, for example, the storage system 1 is connected to one or more host devices 3 via a SAN (Storage Area Network) 2, and to a management device 5 via a LAN (Local Area Network) 4.

A host device 3 is for example a computer device (for example a server machine) comprising a CPU, memory, display device, and other hardware resources. A host device 3 can transmit read commands for data to be read, and write commands together with data for writing, to the storage system 1.

The management device 5 is for example a computer device (for example a personal computer) comprising a CPU, memory, display device, and other hardware resources. In the management device 5, for example, a management program (not shown) can be executed, and this management program can be used to ascertain the operating state of the storage device subsystem 1 and to control operation of the storage system 1. In the management device 5, a web browser or other client program can also be executed, and operation of the storage system 1 can also be controlled using a management program provided by the storage system 1 by means of a CGI (Common Gateway Interface) or similar.

The storage system 1 may be connected to a host device 3 and the management device 5 via a common network, or the host device 3 and management device 5 may be connected using respective dedicated lines. The storage system 1 can be a RAID (Redundant Array of Independent Disks) system.

The media drives 21 are FC-HDDs; the media drives 20 are SATA-HDDs. That is, in this embodiment, a plurality of types of HDDs coexist in the storage system 1.

Each disk controller 10 controls data input and output for the HDDs 20, 21. Each disk controller 10 is provided with, for example, a CPU 101, memory 102, data transfer controller 104, channel interface (hereafter "interface" is abbreviated as "I/F") 105, disk I/F 106, cache memory 107, and LAN I/F 108.

The memory 102 can store various kinds of information.

The cache memory 107 temporarily stores data sent and received between the channel I/F 105 and disk I/F 106 (in other words, data exchanged between a host device 3 and the HDDs 20, 21).

The channel I/F 105 is an interface for the SAN 2, and sends and receives data and control signals with the host 3 by means of, for example, fibre channel protocol.

The disk I/F 106 is an interface for the HDDs 20, 21, and sends and receives data and control signals with the HDDs 20, 21 by means of, for example, fibre channel protocol.

The data transfer controller 104 is connected so as to enable communication with other data transfer controllers 104, and by this means can exchange data with other data controllers 10. The data transfer controller 104 controls transfer of data between the CPU 101, channel I/F 105, disk I/F 106, and cache memory 107. For example, the data transfer controller 104 transfers data read from and written to the HDDs 20, 21 via the SAN 4 between the interfaces 105, 106 via cache memory 107.

The LAN I/F 108 is an interface for the LAN 4, and can send and receive data and control signals to and from the management device 5 by, for example, TCP/IP protocol.

The HDDs 20, 21 are connected to both of the redundant disk controllers 10, so that even if a malfunction occurs in one of the disk controllers 10, access from the other disk controller 10 would be possible. Specifically, for example, each SATA-HDD 20 is connected to the disk I/F 106 of one of the disk controllers 10 via a converter 14 which performs protocol conversion between the FC (fibre channel) protocol and SATA protocol and one of the port bypass circuits (hereafter "PBCs") 12, and moreover is connected to the disk I/F 106 of the other disk controller 10 via a converter 14 and PBC 12. A converter 14 has for example two ports connected to the two PBCs 12, 12, and can also function as a switch to switch the connection to either port. An FC-HDD 21 comprises two ports; because there is no need for protocol conversion, these can be connected to two PBCs 12 without passing through converters 14.

The CPU 101 can execute various processing by reading a prescribed computer program from a prescribed storage area (for example memory 102) and executing the program. For example, when a read command is received from a host device 3, the CPU 101 reads the data for reading specified by the read command from a HDD 20 or 21, writes the data to cache memory 107, and then reads the read-out data from cache memory 107 and transmits the data to the host device 3. For example, when a write command and data for writing are received from a host device 3, the data for writing is temporarily stored in cache memory 107, and the CPU 101 then writes the data for writing stored in cache memory 107 to a HDD 20 or 21 according to the write command.

The above summarizes the storage system of this embodiment.

The HDDs 20 and 21 can also operate according to various parameters set within the HDDs themselves. For example, the FC-HDDs 21 have, as one such parameter, a parameter relating to a limit on the read time length according to the read command (hereafter called a "limit parameter"). Limit parameters include, for example, the retry time, and/or the number of retries. A "read retry" is processing to once again read the same data block. "Retry time" is, for example, the length of time required for a read retry of one data block, or, the total length of time for one or more read retries performed when reading a data block group. The number of retries is for example the maximum number of read retries for the same data block, or is the maximum number of read retries which can be performed when reading a data block group.

Upon detecting that a prescribed type of error has occurred in an HDD 20 or 21, a disk controller (hereafter abbreviated to "CTL") 10 can cause blocking of the HDD 20 or 21 by sending a prescribed signal relating to the error to the HDD 20 or 21. Error types may include, for example, media errors, hardware errors, and interface errors. In this embodiment, "media errors" are errors resulting in failure to read a data block, despite the fact that reading of the data block is physically possible (for example, despite the fact that there are no scratches or other damage in the area on the hard disk). In this embodiment, a "hardware error" is an error occurring in a HDD, and refers to an error other than a media error. In this embodiment, "interface errors" refer to errors occurring between the HDD 20 or 21 and the CTL 10 (not including errors in the HDD 20 or 21 or the CTL 10 itself). When for example a certain type of error classified as a hardware error or as an interface error occurs, the CTL 10 receives the error status and performs analysis, to detect a hardware error or interface error. When for example a certain type of error classified as a media error occurs (for example, an ECC error or a detracking error), the CTL 10 may receive the error status and perform analysis to detect the error, or may make an inference from detection of a time-out in FIG. 2A and failure to detect a time-out in FIG. 2B.

In light of the attributes of each of the above types of error, when for example a hardware error or interface error occurs in a certain HDD 20 or 21, the HDD 20 or 21 may be blocked, but when a media error occurs, the HDD 20 or 21 need not necessarily be blocked.

One conceivable method to ensure that media errors do not occur is to adjust the value of the limit parameter. In an HDD such as a FC-HDD 21 in which limit parameter values can be modified, this method can be adopted. However, in an HDD such as a SATA-HDD 20 in which limit parameter values cannot be modified, this method cannot be adopted.

Hence in the storage system 1 of this embodiment, various innovations are employed in order that SATA-HDDs 20 are not blocked more than necessarily. These innovations are explained in detail below, as one feature of this embodiment.

Figure 2A:
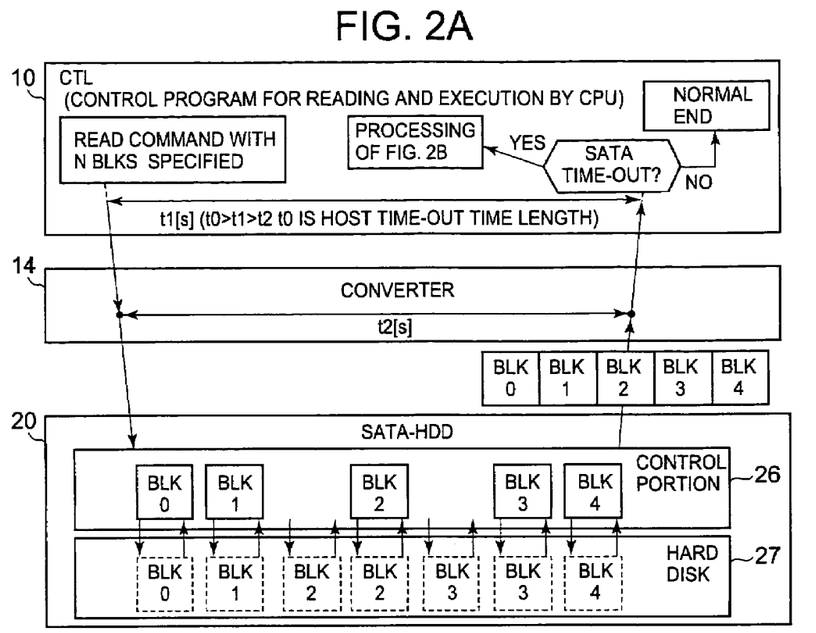
FIG. 2A and FIG. 2B show summaries of the features of an embodiment.
Figure 2B:
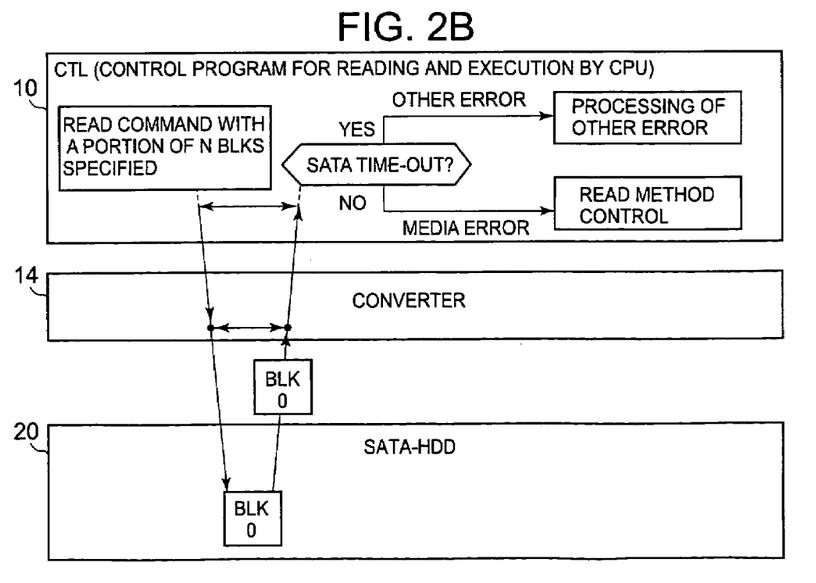

FIG. 2A and FIG. 2B show summaries of features of the embodiment. In the following explanation, the processing performed by the CTL 10 can be performed by for example having the CPU 101 read and execute a control program.

As shown in FIG. 2A, both CTL 10 and the converter 14 have a time-out judgment function to judge whether the length of time from the issuing of a read command until the data block group specified by the read command is received is within a prescribed time-out time length. CTL 10 can for example judge time-outs separately for each SATA-HDD 20. A time-out time length t1 (for example 9 seconds) set in CRL 10 (for example in memory 102) is shorter than a time-out time length t0 set in a host device 3 (for example a server machine) existing on a level above the storage system 1, and moreover is longer than a time-out time length t2 (for example 7 seconds) set in the converter 14.

CTL 10 receives the read command from the host device 3, transmits the read command with N data blocks (where N is an integer equal to or greater than 2) specified to the SATA-HDD 20, and moreover begins counting of the time for the SATA-HDD 20. Suppose that, for this read command, five data blocks (hereafter abbreviated to "BLKs") 0 to 4 are specified (that is, suppose that N=5).

The converter 14 receives the read command for the SATA-HDD 20, converts the read command from FC protocol to SATA protocol, and transmits the converted read command to the SATA-HDD 20. Upon transmission of the read command, the converter 14 begins counting the time.

The SATA-HDD 20 comprises hard disks 27 which store BLKs, and a control portion 26 (for example, a control board and magnetic heads) which controls reading and writing of BLKs to and from the hard disks 27. The control portion 26 receives the read command specifying BLKs 0 to 4, and executes read processing for each of the BLKs 0 to 4 specified by the read command. If a BLK for reading cannot be read, the control portion 26 performs a read retry for the BLK, and by this means can read a BLK which could not be read in a single read processing trial. FIG. 2A shows a case in which each of BLKs 2 and 3 could not be read in a single read processing trial, but subsequently could be read in one read retry. The control portion 26 transmits the BLKs 0 to 4 read from the hard disks 27 to the converter 14.

The converter 14, upon receiving BLKs 0 to 4, transmits the received BLKs 0 to 4 to CTL 10. However, if prior to receiving BLKs 0 to 4 the measured time reaches the time-out time length t2, the converter 14 transmits a time-out report (data to provide notification of a time-out) to CTL 10.

CTL 10, upon receiving BLKs 0 to 4 from the converter 14, normally ends read command processing. However, if the time being measured reaches the time-out time length t1 before receiving BLKs 0 to 4, or if a time-out report is received from the converter 14, a time-out occurs, and CTL 10 executes the processing of FIG. 2B.

When a time-out occurs, as indicated in FIG. 2B, CTL 10 executes processing to judge whether the time-out is due to a media error. Specifically, CTL 10 generates a new read command (that is, a read command specifying a number M of BLKs smaller than N) specifying a portion (for example, the beginning BLK 0) of the N BLKs specified by the preceding read command, and transmits this new read command to the same SATA-HDD 20 to which the preceding read command had been transmitted. Here, the value of M is for example an integer greater than or equal to 1, and moreover is equal to or smaller than the quotient of the time-out time t1 or t2 divided by the maximum read time length for 1 BLK in the SATA-HDD 20. The maximum read time length can be determined by multiplying the number of retries for 1 BLK (the value of the parameter set for the SATA-HDD 20) by the time required for one read retry. For example, if the number of retries is 2, and the time required for one read retry is 1.5 seconds, then the maximum read time length is 3 seconds.

If the CTL 10 receives the BLKs (for example BLK 0) specified by the new read command before the time-out time t1 elapses after transmitting the new read command, then the time-out which had previously occurred may be regarded as due to a media error. In this case, CTL 10 subsequently changes the read method for the SATA-HDD 20 for which the time-out had occurred from the normal method to a different method. Specifically, for example CTL 10, when issuing a read command to a SATA-HDD 20 for which a time-out has previously occurred, subsequently sets the number of BLKs specified by the read command to a number (M) smaller than the normal number (N).

On the other hand, when the time-out time t1 is reached after CTL 10 transmits the new read command, without the BLK specified by the new read command being received, or when a time-out report is received from the converter 14, the time-out which had previously occurred may be regarded as due to another error other than a media error. In this case, CTL 10 executes processing to cope with this other error (for example, blocking the SATA-HDD 20 for which the time-out has again occurred).

Below, an example of the flow of processing performed in this embodiment is explained in detail. In the following explanation, CTL 10 is assumed not to monitor time-outs; of course monitoring of time-outs, that is, measurement of time elapsed, can be performed by both CTL 10 and by the converter 14, or can be performed by CTL 10 and not by the converter 14.

Figure 3:
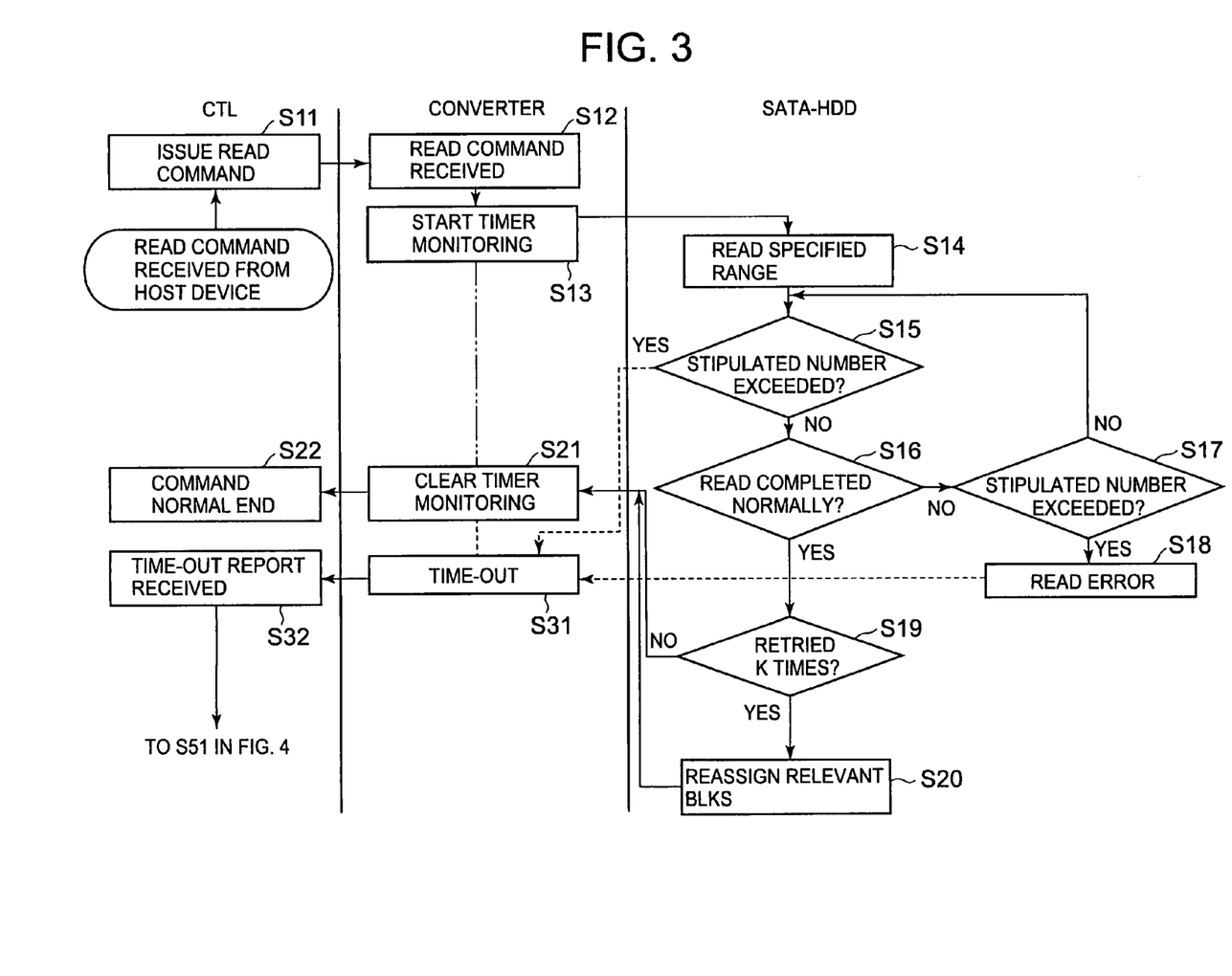
FIG. 3 shows an example of the flow of processing performed in a normal read method.

FIG. 3 shows an example of the flow of processing performed in a normal read method.

Upon receiving from a host device 3 a read command for a logical volume in which a SATA-HDD 20 is set, CTL 10 issues, to the SATA-HDD 20 provided by the logical volume, a read command (for example, the read command from the host device 3 itself) specifying a prescribed number N of BLKs (step S11).

The converter 14 connected to this SATA-HDD 20 receives the read command for the SATA-HDD 20 (S12). The converter 14 performs protocol conversion of the received read command, starts timer monitoring (that is, a clock) (S13), and transmits the protocol-converted read command to the SATA-HDD 20 to which it is itself connected.

The control portion 26 of the SATA-HDD 20 receives the read command, and attempts to read the range specified by the read command, that is, each of the N BLKs (S14).

In the event of step S14, when for example, before performing a number of read retries exceeding the value of the "number of retries for one read command" parameter set for the SATA-HDD 20 ("NO" in S15), the specified N BLKs are read successfully ("YES" in S16), if the control portion 26 has not performed a number of read retries exceeding the value of the "number of retries for 1 BLK" parameter set for the SATA-HDD 20 ("NO" in S19), then the read-out N BLKs are transmitted to the converter 14. If the result in S16 is "YES", then if the prescribed number of read retries for the one read command have been performed ("YES" in S19), the control portion 26 reassigns (that is, overwrites) the N BLKs (S20), and transmits the read-out N BLKs to the converter 14.

In the event of step S14, when for example the result of step S15 is "NO" and moreover the specified N BLKs have not been read ("NO" in S16), the control portion 26 judges whether a number of read retries exceeding the value set as the "number of retries for one BLK" parameter set for the SATA-HDD 20 has been performed (S17). If such a number has not been performed ("NO" in S17), the control portion 26 returns to S15; if such a number has been performed ("YES" in S17), a read error occurs (S18).

The converter 14, upon receiving BLKs before time-out time t2 has elapsed after execution of S13, clears the timer monitoring count (that is, stops the clock) (S21), and transmits the received BLKs to CTL 10. However, if the BLKs have not been received even after the time-out time t2 has elapsed from execution of S13, a time-out occurs, and the converter 14 transmits a time-out report to CTL 10 (S31).

Figure 4:
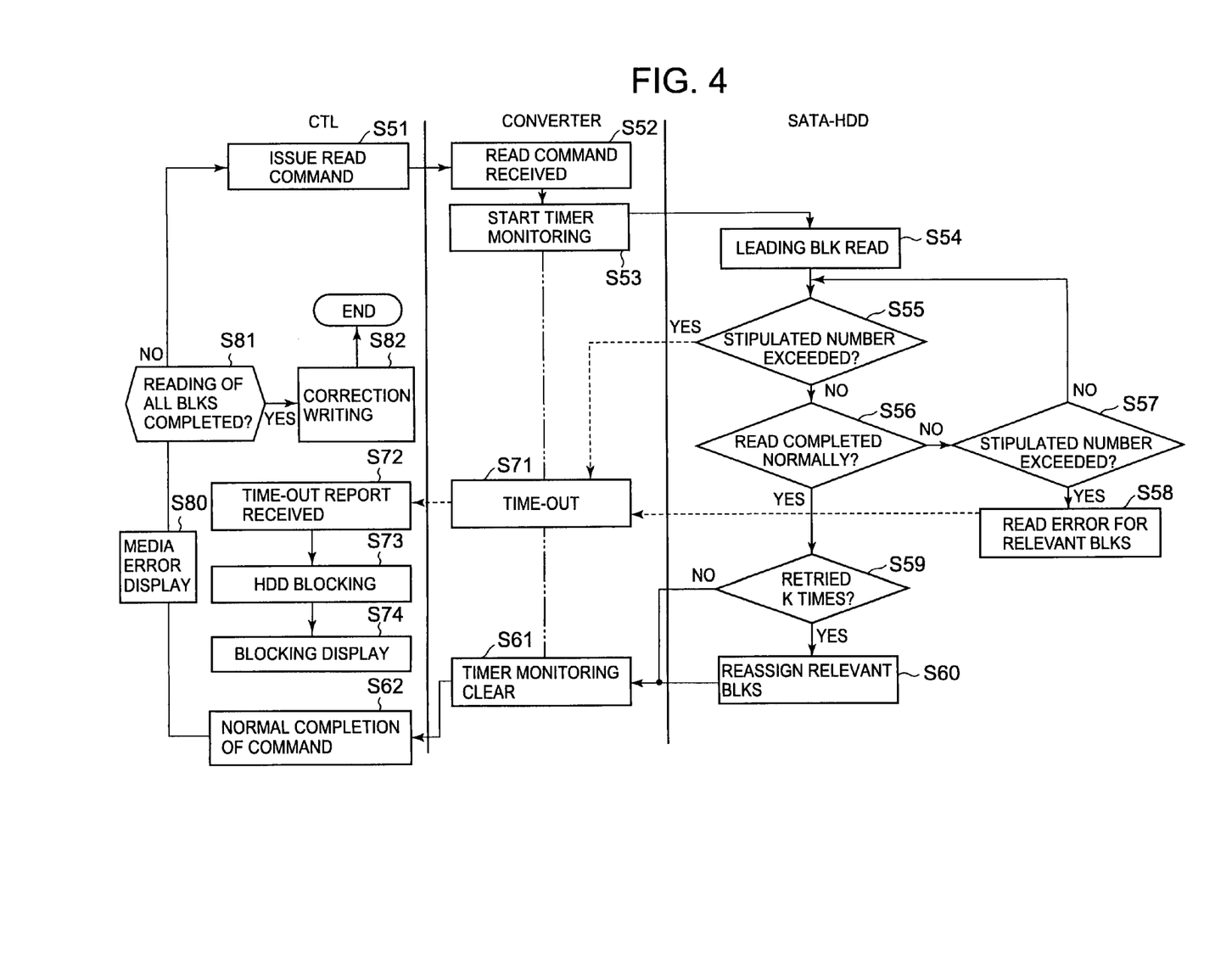
FIG. 4 shows an example of the flow of processing performed when CTL 10 receives a time-out report.

Upon receiving the BLKs specified by the read command, CTL 10 can normally end read command processing (S22), but if a time-out report is received (S32), the processing of S51 and beyond in FIG. 4 is performed.

FIG. 4 shows an example of the flow of processing performed when CTL 10 receives a time-out report.

CTL 10 generates a new read command specifying a portion of the BLK group (N BLKs) specified by the preceding read command (the read command of S11), and issues the new read command to the SATA-HDD 20 which had been the destination of the preceding read command. By this means, the same processing as in the above S12 to S21 and S31 is performed (S52 to S61 and S71).

Figure 5A:
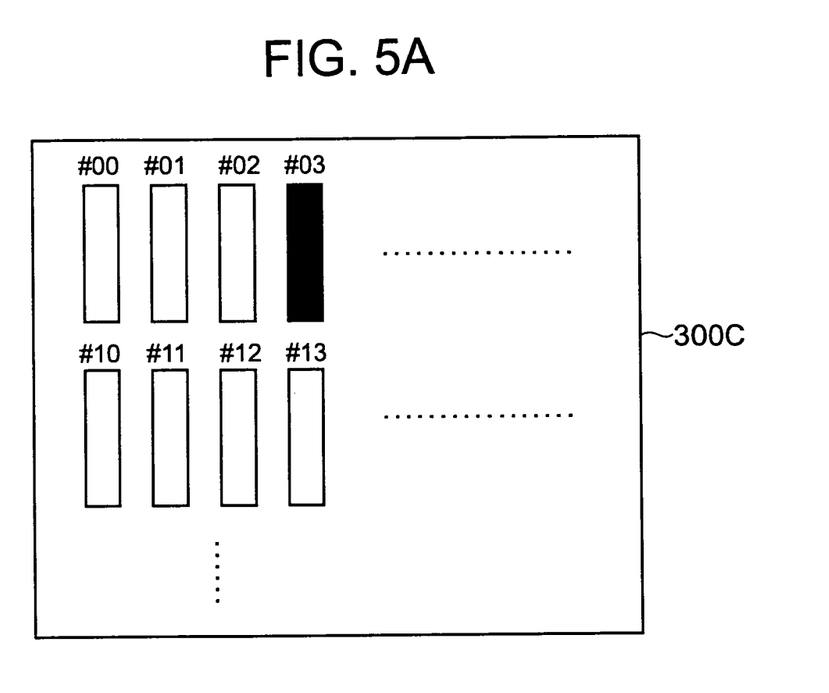
FIG. 5A shows an example of a screen displayed when a SATA-HDD is blocked.

When CTL 10 again receives a time-out report even after issuing the above new read command (S72), it is inferred that the cause of the time-out is an error other than a media error, and so the SATA-HDD is blocked (S73). In this case, CTL 10 can display information indicating that a SATA-HDD has been blocked. Specifically, for example, CTL 10 can display a screen such as illustrated in FIG. 5A, that is, a screen indicating that the SATA-HDD has been blocked, on the management device 5, a host device 3, or some other prescribed device. In the screen 300C, for example the plurality of HDDs 20, 21 provided in the storage system 1 are displayed, and moreover the display mode of blocked HDDs is different from the display mode for HDDs which are not blocked (for example, symbols for blocked HDDs are filled with black).

When CTL 10 issues the new read command and receives the BLKs specified by the new read command without receiving a time-out report, processing for the new read command ends (S62).

When the above new read command is issued and a time-out report is not received, the time-out which had previously occurred is inferred to be caused by a media error. In this case, CTL 10 does not immediately block the SATA-HDD 20.

Figure 5B:
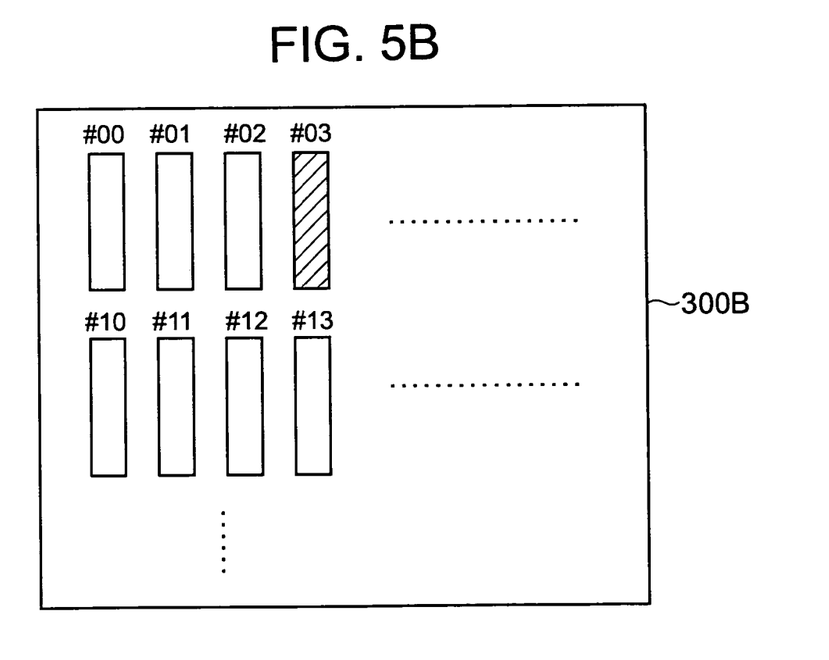
FIG. 5B shows an example of a screen displayed when a media error occurs in a SATA-HDD.

Specifically, for example, the CTL 10 display information indicating that a media error has occurred in the SATA-HDD 20. Specifically, for example, CTL 10 causes a screen 300B to be displayed, on a prescribed device of the management device 5 or a host device 3, indicating that a media error has occurred in the SATA-HDD, such as for example the screen shown in FIG. 5B.

If not all of the BLKs specified by the read command in S11 of FIG. 3 are read ("NO" in S81), CTL 10 again executes S51 in order to read the remaining BLKs. The number of BLKs specified by CTL 10 in the read commands of S51 the second and subsequent times may be the same as or different from the number of BLKs specified by the read command of S51 the first time. And the numbers of BLKs specified by CTL 10 in S51 the second and subsequent times may be the same or different. Specifically, when for example CTL 10 detects that a time-out has occurred for the read command of S11 in FIG. 3, CTL 10 issues a read command specifying a number P (where P is an integer equal to or greater than one) of BLKs, and when a time-out is not detected for this read command, subsequently may issue read command specifying a number Q of BLKs (where P<Q<N).

Figure 6A:
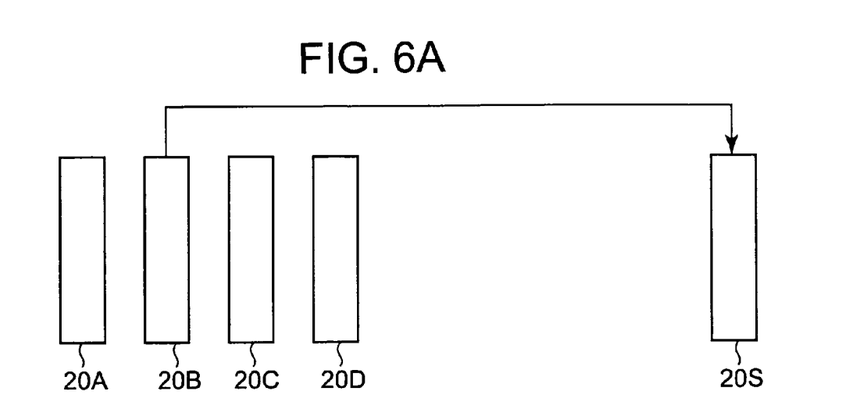
FIG. 6A explains correction writing performed in the first embodiment of the invention.
Figure 6B:
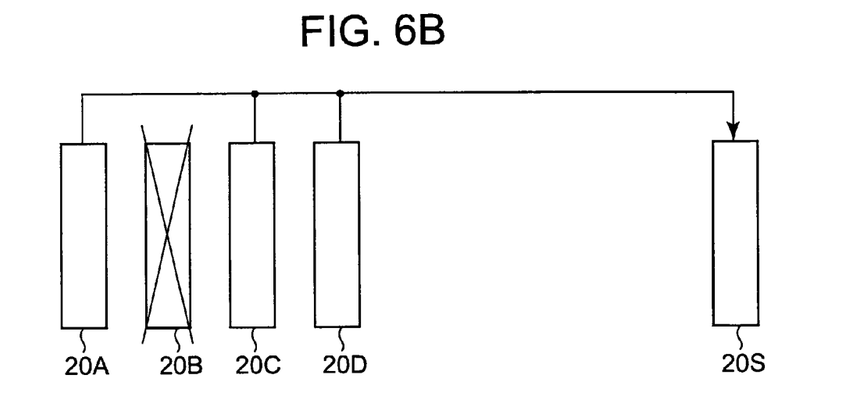
FIG. 6B explains an example of correction writing which may be performed when an HDD is blocked immediately after a time-out occurs.
Figure 6C:
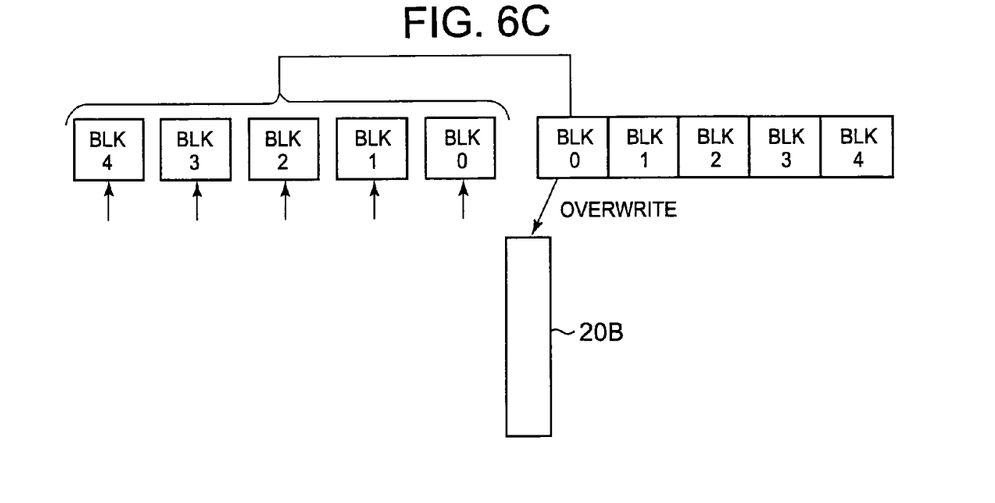
FIG. 6C explains another correction writing performed in the first embodiment of the invention; and, FIG. 7 shows an example of the flow of processing performed in a second embodiment of the invention.

If, by repeating S51 and S62, all of the BLKs specified by the read command of S11 in FIG. 3 are read ("YES" in S81), CTL 10 executes correction writing (S82), and ends processing of the read command of S11. In this correction writing, for example, CTL 10 generates a write command to write the N BLKs obtained through repetition of S51 and S62, and issues this write command to the spare SATA-HDD 20S (or to a FC-HDD 21) as illustrated in FIG. 6A. In this correction writing, CTL 10 can overwrite the SATA-HDD 20B for which a time-out was detected with the N BLKs obtained through repetition of S51 and S62, as illustrated in FIG. 6C.

The above is an explanation of the first embodiment. In the above explanation, an example was used taking SATA-HDDs 20 as representative; however, the processing of FIG. 2A and FIG. 2B can for example be applied to an FC-HDD 21 or to other types of HDD, and in addition can be applied to other types of media drives in addition to HDDs.

According to the above-described first embodiment, functions (hereafter "time-out judgment functions") are provided, on a level above the HDDs 20, 21, enabling judgment as to whether a time-out has occurred for a read command (specifying N BLKs) issued to a HDD 20 or 21. When a read command is issued to a HDD 20 or 21, if a time-out is judged to have occurred by the time-out judgment function, CTL 10 issues, to the HDD to which the previous read command had been issued (the relevant HDD), a read command specifying a portion of the BLK group specified by the previously issued read command. In this case, if a time-out occurs once again, it is inferred that the cause of the previous time-out occurrence was an error other than a media error, and so CTL 10 blocks the relevant HDD. However, if no time-out occurs, it is inferred that the cause of the previous time-out occurrence was a media error, and so CTL 10 does not block the relevant HDD, but subsequently reads the N BLKs using read commands which specify a number of BLKs smaller than N. By this means, it is possible to avoid blocking HDDs more than is necessary. This is advantageous for media drives such as SATA-HDDs 20, that is, drives having an unmodifiable value for a limit parameter (for example, number of retries and/or retry time).

According to the above-described first embodiment, the correction writing illustrated in FIG. 6A (in other words, correction copying) is performed; that is, the N BLKs obtained through repeated issuing of read commands specifying a small number of BLKs are written to a spare HDD 20S or 21. As another method of correction writing, for example, as illustrated in FIG. 6B, a SATA-HDD 20B for which a time-out has occurred is blocked, N BLKs each are read from other HDDs 20A, 20C and 20D, and from the read-out BLKs, the BLKs stored in the blocked SATA-HDD 20B are restored, and the restored BLKs are written to a spare HDD 20S or 21. However, in this other method, when reading the N BLKs from the other HDDs 20A, 20C and 20D, if a time-out occurs for another HDD, the HDD must also be blocked. That is, in this other method, dual blocking may occur. In the first embodiment, correction writing can be executed without the occurrence of such dual blocking.

According to the above-described first embodiment, the correction writing illustrated in FIG. 6C is performed, that is, the N BLKs obtained through repeated issuing of read commands specifying a small number of BLKs are overwritten onto a SATA-HDD 20B for which time-out occurrence has been detected. By this means, it is possible to reduce the possibility of occurrence of time-outs when reading the same N BLKs from the same SATA-HDD 20B.

Embodiment 2

A second embodiment of the invention is explained. In the following explanation, points of difference with the first embodiment are mainly explained, and points in common with the first embodiment are simplified or are omitted from the explanation.

Figure 7:
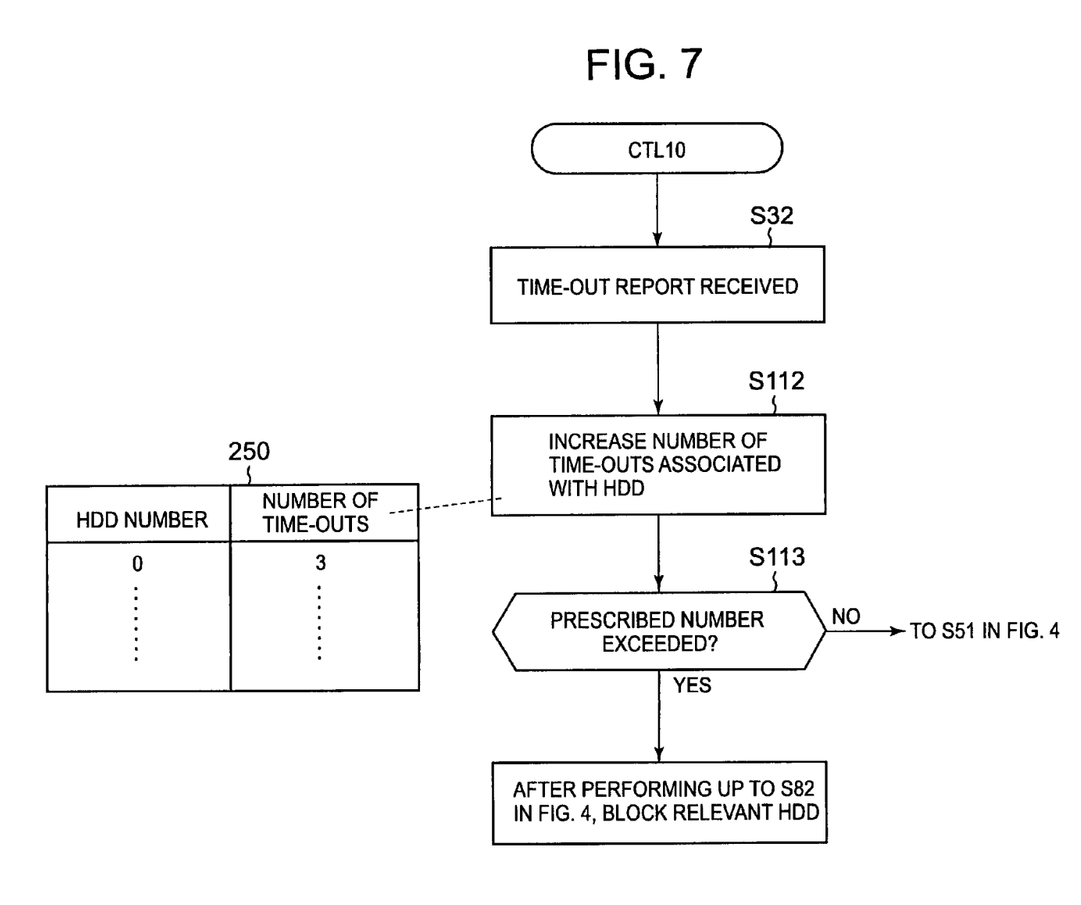

FIG. 7 shows an example of the flow of processing performed in the second embodiment of the invention.

In this second embodiment, when a read command is issued with N BLKs specified, if a time-out occurs, in some cases the HDD to which the read command was issued may be blocked, regardless of whether the cause was a media error or not.

For example, a time-out management table 250 is stored in memory 102 of CTL 10. The time-out management table 250 records, for each HDD, the HDD number, and the number of time-outs occurring when a read command is issued to the HDD.

After S32 in FIG. 3 (that is, after receiving a time-out report when a read command for N BLKs has been issued), CTL 10 increases the number of time-outs associated with the HDD (the destination of the read command for N BLKs) in the time-out management table 250 (S112). Then, if the increased number of time-outs does not exceed a prescribed number ("NO" in S113), CTL 10 performs S51 in FIG. 4, but if the prescribed number is exceeded ("YES" in S113), after performing up to S82 in FIG. 4 (that is, after collection writing), the relevant HDD is blocked (S73 in FIG. 4).

According to this second embodiment, even if the cause of occurrence of a time-out is a media error, when there are frequent time-outs, the relevant HDD is blocked. By this means, reductions in the reliability of the storage system 1 can be suppressed. When the relevant HDD is blocked, the BLKs in the blocked HDD can be obtained from a spare HDD 20S or 21.

In the above, a number of preferred embodiments of the invention have been explained; but these are illustrations used to explain the invention, and the scope of the invention is not limited only to these embodiments. This invention can be implemented with various modifications.

For example, processing to repeatedly issue read commands specifying a smaller number of BLKs than the N BLKs specified in the preceding read command may be performed until the N BLKs are obtained, or, when a read command is issued according to a separate read command from the host device 3, this processing may be performed.

Further, among the various functions of CTL 10, a host device 3 may be provided with for example a function to detect time-outs, or with a function to issue a read command with the specified number of BLKs changed. That is, some of the processing performed by CTL 10 in FIG. 2A and FIG. 2B may be performed by a host device 3 in place of CTL 10.

What is claimed is:

1. A storage system, comprising:
   a plurality of media drives; and
   a controller capable of issuing read commands to each of said plurality of media drives,
   wherein said controller issues a first read command specifying a plurality of data blocks, to a certain media drive, and when a time-out is detected for said first read command, generates a second read command specifying a portion of the data blocks among said plurality of data blocks, and issues said second read command to said certain media drive; and
   upon receiving said portion of data blocks without detecting a time-out for said second read command, said controller issues said second read command one or more times to said certain media drive, to read said plurality of data blocks specified by said first read command from said certain media drive.

2. The storage system according to claim 1, wherein said certain media drive is a media drive having an unmodifiable parameter value relating to a limit on the length of the read time for data blocks specified by read commands.

3. The storage system according to claim 2, wherein said certain media drive is a hard disk drive having an interface conforming to a Serial ATA (SATA) standard.

4. The storage system according to claim 1, wherein the number of data blocks constituting said portion of data blocks is a value equal to or less than the quotient obtained by dividing the length of time from issue of a read command until time-out by the maximum length of time for reading one data block in said certain media drive.

5. The storage system according to claim 1, wherein said controller sets the number of data blocks specified by a second-trial of the second read command and subsequent trials to be greater than the number of data blocks specified in a first-trial of the second read command after detection of a time-out for said first read command.

6. The storage system according to claim 1, wherein said plurality of media drives comprise a spare media drive, and said controller, upon reading said plurality of data blocks by issuing said second read command one or more times, issues to said spare media drive a write command to write said plurality of data blocks.

7. The storage system according to claim 1, wherein said controller, upon reading said plurality of data blocks by issuing said second read command one or more times, can issue to said certain media drive a write command to overwrite said certain media drive.

8. The storage system according to claim 1, wherein said controller, upon detecting a time-out for said second read command, blocks said certain media drive.

9. The storage system according to claim 1, wherein said controller, upon issuing said second read command to said certain media drive, performs display relating to said certain media drive, and moreover changes the display mode according to whether a time-out has occurred for said second read command or according to whether the media drive is blocked.

10. The storage system according to claim 1, wherein said controller can transmit said first read command a plurality of times to said certain media drive, and if time-out is detected a prescribed number of times in said plurality of transmissions, blocks said certain media drive.

11. A storage control method, comprising the steps of:
   issuing a first read command specifying a plurality of data blocks to a certain media drive;
   generating a second read command specifying a portion of the data blocks among said plurality of data blocks, and issuing said second read command to said certain media drive when a time-out is detected for said first read command; and
   reading said plurality of data blocks specified by said first read command from said certain media drive by issuing said second read command one or more times to said certain media drive when said portion of data blocks are received without detecting a time-out for said second read command.

12. A storage system, comprising:
   a plurality of hard disk drives (HDDs) comprising Serial ATA hard disk drives (SATA-HDDs) having interfaces conforming to the SATA standard; and
   issues a first read command specifying a plurality of data blocks to said SATA-HDD;
   upon detecting a time-out for said first read command, generates a second read command specifying a portion of the data blocks among said plurality of data blocks, and issues said second read command to said SATA-HDD;
   upon detecting said portion of data blocks without detecting a time-out for said second read command, reads said plurality of data blocks specified by said first read command from said SATA-HDD by issuing said second read command to said SATA-HDD one or more times;
   issues, to a spare HDD and/or to said SATA-HDD, a write command to write said plurality of data blocks read from said SATA-HDD; and
   upon detecting a time-out for said second read command; or upon detecting a prescribed number of time-outs for said first read command, blocks said SATA-HDD.

* * * * *